United States Patent
Fazal et al.

(10) Patent No.: US 8,230,480 B2
(45) Date of Patent: Jul. 24, 2012

(54) METHOD AND APPARATUS FOR NETWORK SECURITY BASED ON DEVICE SECURITY STATUS

(75) Inventors: Lookman Y. Fazal, Somerset, NJ (US); Martin Kappes, Gilching (DE); Anjur S. Krishnakumar, Rocky Hill, NJ (US); Parameshwaran Krishnan, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 808 days.

(21) Appl. No.: 10/832,107

(22) Filed: Apr. 26, 2004

(65) Prior Publication Data

US 2005/0246767 A1    Nov. 3, 2005

(51) Int. Cl.
*H04L 29/06* (2006.01)

(52) U.S. Cl. ............. 726/2; 726/1; 726/3; 726/4; 726/5; 726/6; 726/21; 713/155; 713/172; 713/174; 709/225; 709/226; 709/227; 709/228; 709/229

(58) Field of Classification Search ........................ None
See application file for complete search history.

(56) References Cited

U.S. PATENT DOCUMENTS

| | | | | |
|---|---|---|---|---|
| 5,968,176 | A * | 10/1999 | Nessett et al. | 726/11 |
| 6,230,271 | B1 * | 5/2001 | Wadlow et al. | 726/1 |
| 6,484,262 | B1 * | 11/2002 | Herzi | 726/34 |
| 7,050,396 | B1 * | 5/2006 | Cohen et al. | 370/235 |
| 7,225,461 | B2 * | 5/2007 | Oshima et al. | 726/3 |
| 7,249,187 | B2 * | 7/2007 | Sobel et al. | 709/229 |
| 7,373,667 | B1 * | 5/2008 | Millard | 726/24 |
| 7,409,447 | B1 * | 8/2008 | Assadzadeh | 709/225 |
| 7,424,745 | B2 * | 9/2008 | Cheston et al. | 726/24 |
| 7,448,067 | B2 * | 11/2008 | Yadav | 726/1 |
| 7,540,014 | B2 * | 5/2009 | Vasishth et al. | 726/1 |
| 7,546,629 | B2 * | 6/2009 | Albert et al. | 726/1 |
| 7,607,174 | B1 * | 10/2009 | Kashchenko et al. | 726/25 |
| 7,660,700 | B2 * | 2/2010 | Moskowitz et al. | 702/182 |
| 7,661,123 | B2 * | 2/2010 | Fakes et al. | 726/1 |
| 7,676,841 | B2 * | 3/2010 | Sobchuk et al. | 726/23 |
| 7,734,784 | B1 * | 6/2010 | Araujo et al. | 709/226 |
| 7,769,860 | B1 * | 8/2010 | Assadzadeh | 709/225 |
| 7,827,606 | B2 * | 11/2010 | Rits et al. | 726/17 |
| 7,836,501 | B2 * | 11/2010 | Sobel et al. | 726/22 |
| 8,001,610 | B1 * | 8/2011 | Chickering et al. | 726/27 |
| 2002/0157090 | A1 | 10/2002 | Anton, Jr. | |

(Continued)

OTHER PUBLICATIONS

U.S. Appl. No. 10/721,721, filed Nov. 25, 2003, Kappes. Cisco NAC,http:www.cisco.com/warp/public/cc/so/neso/sqso/csdni_wp.htm. (2004).

(Continued)

*Primary Examiner* — Syed A. Zia
(74) *Attorney, Agent, or Firm* — Maldjian Law Group LLC; John P. Maldjian, Esq.; Alexander D. Walter, Esq.

(57) ABSTRACT

A method and apparatus are provided for network security based on a security status of a device. A security update status of a device is evaluated; and one or more of a plurality of security policies are selected to apply to the device based on the security update status. The available security philosophies may include, for example, a "protect the good" philosophy, an "encourage the busy" philosophy and a "shut off the non-compliant" philosophy. The security update status can evaluate, for example, a version level of one or more security features installed on the device or can be based on a flag indicating whether the device satisfies predefined criteria for maintaining one or more computer security protection features up-to-date.

29 Claims, 8 Drawing Sheets

U.S. PATENT DOCUMENTS

| | | | |
|---|---|---|---|
| 2002/0174422 A1 | 11/2002 | Kelley et al. | |
| 2003/0167405 A1* | 9/2003 | Freund et al. | 713/201 |
| 2004/0064727 A1* | 4/2004 | Yadav | 713/201 |
| 2004/0088567 A1* | 5/2004 | Lamotte | 713/200 |
| 2004/0167984 A1* | 8/2004 | Herrmann | 709/229 |
| 2005/0125694 A1* | 6/2005 | Fakes et al. | 713/201 |
| 2006/0005254 A1* | 1/2006 | Ross | 726/27 |
| 2008/0010454 A1* | 1/2008 | Holden et al. | 713/166 |
| 2009/0037594 A1* | 2/2009 | Sever et al. | 709/230 |

OTHER PUBLICATIONS

Network World Fusion article on "Cisco's Security Plan Eyed Warily," http://www/nwfusion.com/news/203/1124ciscosec.html., downloaded Aug. 30, 2004.

infoExpress, http://www.infoexpress.com, downloaded Aug. 30, 2004.

Schneider et al., "Applied Cryptography", Protocols, Algorithms, and Source Code in C, New York, John Wiley & Sons, pp. 523-525, Jan. 1, 1996.

* cited by examiner

DEVICE DATABASE 500

| | DEVICE IDENTIFIER 510 | SECURITY STATE 530 |
|---|---|---|
| 501 | MAC / IP ADDRESS 1 | OS REV. 1.11; VIRUS SCAN UPDATED 4/25/04 |
| 502 | MAC / IP ADDRESS 2 | OS REV. 1.02; VIRUS SCAN UPDATED 2/25/04 |
| ... | | |
| 503 | MAC / IP ADDRESS 3 | OS REV. 1.11a; VIRUS SCAN UPDATED 4/24/04 |

METHOD AND APPARATUS FOR NETWORK SECURITY BASED ON DEVICE SECURITY STATUS

FIELD OF THE INVENTION

The present invention relates generally to network security techniques and more particularly, to methods and apparatus for network security that ensure the security state of connected devices and limit the ability of non-compliant devices to access a network.

BACKGROUND OF THE INVENTION

As our dependence on our networks and networked devices grows, the security of such networks and network devices becomes even more important. Network designers and system administrators must establish security policies that provide a balance between ease-of-use for users while also protecting the networks and network devices from undesirable events. Most networks and network devices incorporate computer security techniques, such as access control mechanisms, to prevent unauthorized users from accessing the networks or network devices. User authentication is the process of verifying the identity of a user in a computer system, often as a prerequisite to allowing access to resources in the system.

An important issue in securing networks is to ensure that the computer security protection features installed in each device in the network are up-to-date. If the installed computer security protection features are kept up-to-date, the devices will be best protected from attacks by viruses, worms and other threats in general referred to as malware. Recent attacks by viruses and worms have posed a severe security risk, caused significant losses in the productivity of enterprises and put a strain on system administrators. Given the significant economic impact of such attacks, enterprises would like to distribute and apply updates to such computer security protection features that protect against new vulnerabilities as early as possible. However, it is currently virtually infeasible to force pushing such updates to all affected devices. Moreover, some devices, such as laptop computers and other portable devices, may not remain connected to the network at all times and thus would not necessarily be available to receive and process such updates.

Malware can attack a device at various times, depending on the particular security vulnerability exploited by the malware. For example, many typical vulnerabilities can be exploited after the device obtains an IP address or when an application is initiated. By keeping the computer security protection features of a device up-to-date, the device can be secured against known vulnerabilities. Therefore, it is important that the device gets updated as early as possible and, in the best case, before a potential vulnerability is exploited.

It is also important to restrict the access of non-compliant devices to the network. If the computer security protection features of a device cannot be updated, e.g., because the device is not connected to the network, the non-compliant device should be excluded from using the network or certain network services. From a system management perspective, the users of such non-compliant devices should be notified and provided the opportunity to update the device using a restoration service, e.g., that provides an update file or virus definition data.

A need therefore exists for network access control techniques that ensure that the security features of connected devices are up-to-date and that non-compliant devices have limited access, if any. A further need exists for network access control techniques that discover the current state of connected devices and update devices as early as possible in the timeline.

SUMMARY OF THE INVENTION

Generally, a method and apparatus are provided for network security based on a security status of a device. According to one aspect of the invention, a security update status of a device is evaluated; and one or more of a plurality of security policies are selected to apply to the device based on the security update status and network policies. In an exemplary implementation, the available security philosophies include a "protect the good" philosophy, an "encourage the busy" philosophy and a "shut off the non-compliant" philosophy. The security update status can evaluate, for example, a version level of one or more security features installed on the device or can be based on a flag indicating whether the device satisfies predefined criteria for maintaining one or more computer security protection features up-to-date.

According to a "protect the good" protection philosophy, a device satisfying predefined criteria for maintaining computer security protection features up-to-date is allowed to communicate only with one or more update servers if the security update status of the device does not satisfy a security policy. A client-side security function, such as a firewall, can protect the device from malware prior to such updating of the security update status. According to a "encourage the busy" protection philosophy, a device that does not satisfy predefined criteria for maintaining one or more computer security protection features up-to-date is prevented from accessing one or more network services. In this manner, the "busy" user is encouraged to update his or her security features before being able to access such restricted network services. According to a "shut off the non-compliant" protection philosophy, a device that does not satisfy predefined criteria for maintaining one or more computer security protection features up-to-date, is prevented from accessing the network (except, perhaps, for one or more predefined security servers, such as authentication or update servers).

A more complete understanding of the present invention, as well as further features and advantages of the present invention, will be obtained by reference to the following detailed description and drawings.

DETAILED DESCRIPTION

Figure 1:
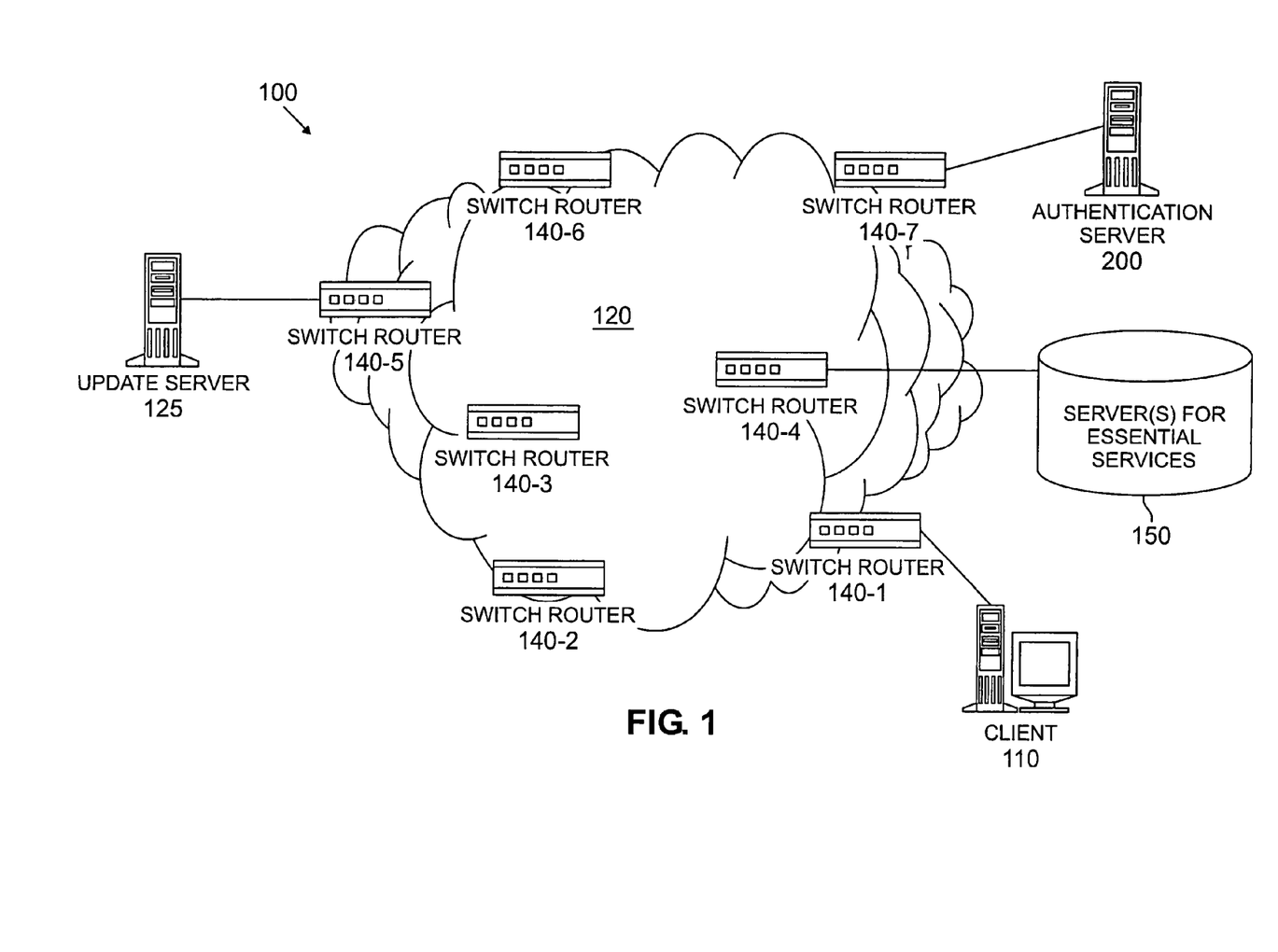
FIG. 1 illustrates a network environment in which the present invention can operate.

FIG. 1 illustrates an exemplary network environment 100 in which the present invention can operate. As shown in FIG.

1, a user employing a client computing device 110 attempts to access a network 120, such as an enterprise network, or a device or other resource connected to the network 120. Typically, an enterprise network is considered the portion of the network that is "inside" the enterprise, i.e., the portion of the network that is protected from "outside" of the enterprise by firewalls and similar security applications. As shown in FIG. 1, the network 120 comprises one or more switch/routers 140-1 through 140-7 for interconnecting one or more client devices 110, one or more update servers 125, one or more authentication servers 200, discussed further below in conjunction with FIG. 2, and one or more servers 150 for one or more essential services. The client computing devices 110 may be any device capable of communicating over a network 120, such as computing devices and IP telephones. While it is assumed for ease of illustration that all devices 110 are operational on the IP layer, the present invention may nonetheless be implemented without IP enablement, as would be apparent to a person of ordinary skill in the art.

The present invention provides a network security framework 300, discussed further below in conjunction with FIG. 3, that provides methods and apparatus to protect a network 120, such as an enterprise network, against one or more malware attacks, including viruses, worms, trojans, and malicious applets. The network security framework 300 ensures the compliance-level of connected devices 110 through detection of the state of devices 110, provides automatic updates of clients, for example, using an update server 125, and restricts the access of non-compliant devices based on administrator policy.

Figure 2:
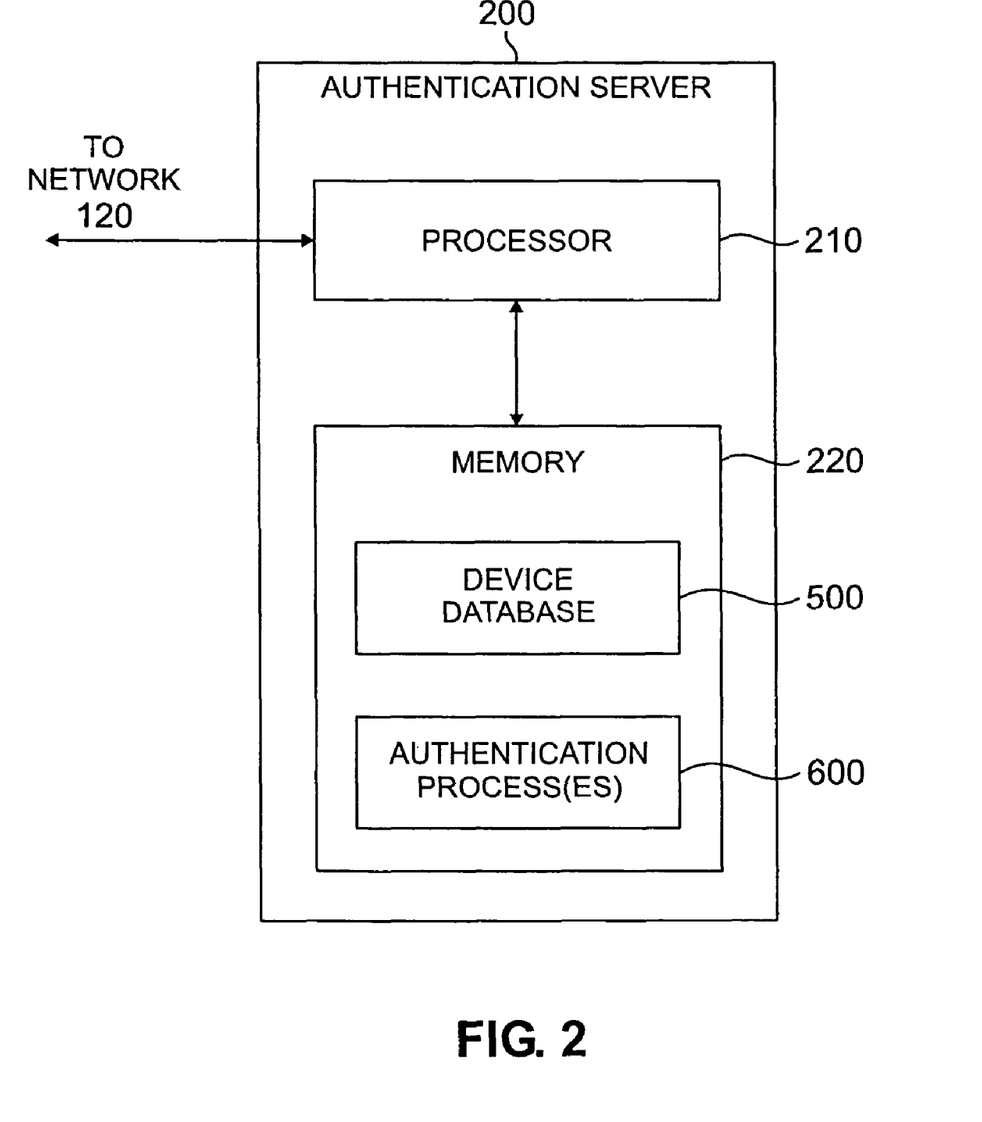
FIG. 2 is a schematic block diagram of an exemplary authentication server of FIG. 1 in further detail.

FIG. 2 is a schematic block diagram of an exemplary authentication server 200 incorporating features of the present invention. As discussed further below in conjunction with FIGS. 4 and 5, the authentication server 200 implements one or more security features and functions from a set of protection philosophies 410, 420, 430. The authentication server 200 may be any computing device, such as a personal computer, work station or server. As shown in FIG. 2, the exemplary authentication server 200 includes a processor 210 and a memory 220, in addition to other conventional elements (not shown). The processor 210 operates in conjunction with the memory 220 to execute one or more software programs. Such programs may be stored in memory 220 or another storage device accessible to the authentication server 200 and executed by the processor 210 in a conventional manner. For example, as discussed below in conjunction with FIGS. 5 and 6, the memory 220 may store a device database 500 and one or more security compliance state-based network security processes 600. In the exemplary embodiment, the authentication server 200 incorporates three security compliance state-based network security processes 600-1, 600-2 and 600-3, as discussed further below in conjunction with FIGS. 6A, 6B and 6C, respectively. In an actual implementation, the authentication server 200 could implement one or more of the security compliance state-based network security processes 600. Generally, the device database 500 records information for each device 110 in the network 120 and each security compliance state-based network security process 600 implements one or more security philosophies of the present invention, discussed below in conjunction with FIG. 4.

Generally, as discussed further below, the client employing the client computing device 110 is challenged by the authentication server 200. The authentication server 200 may be associated, for example, with an enterprise or another network where network security is provided. While the present invention is illustrated in the context of an exemplary enterprise network 120, the present invention applies to many network environments where a network security policy is administered. The network 120 may include wired or wireless network portions or a combination of the foregoing.

Network Security Framework 300

Figure 3:
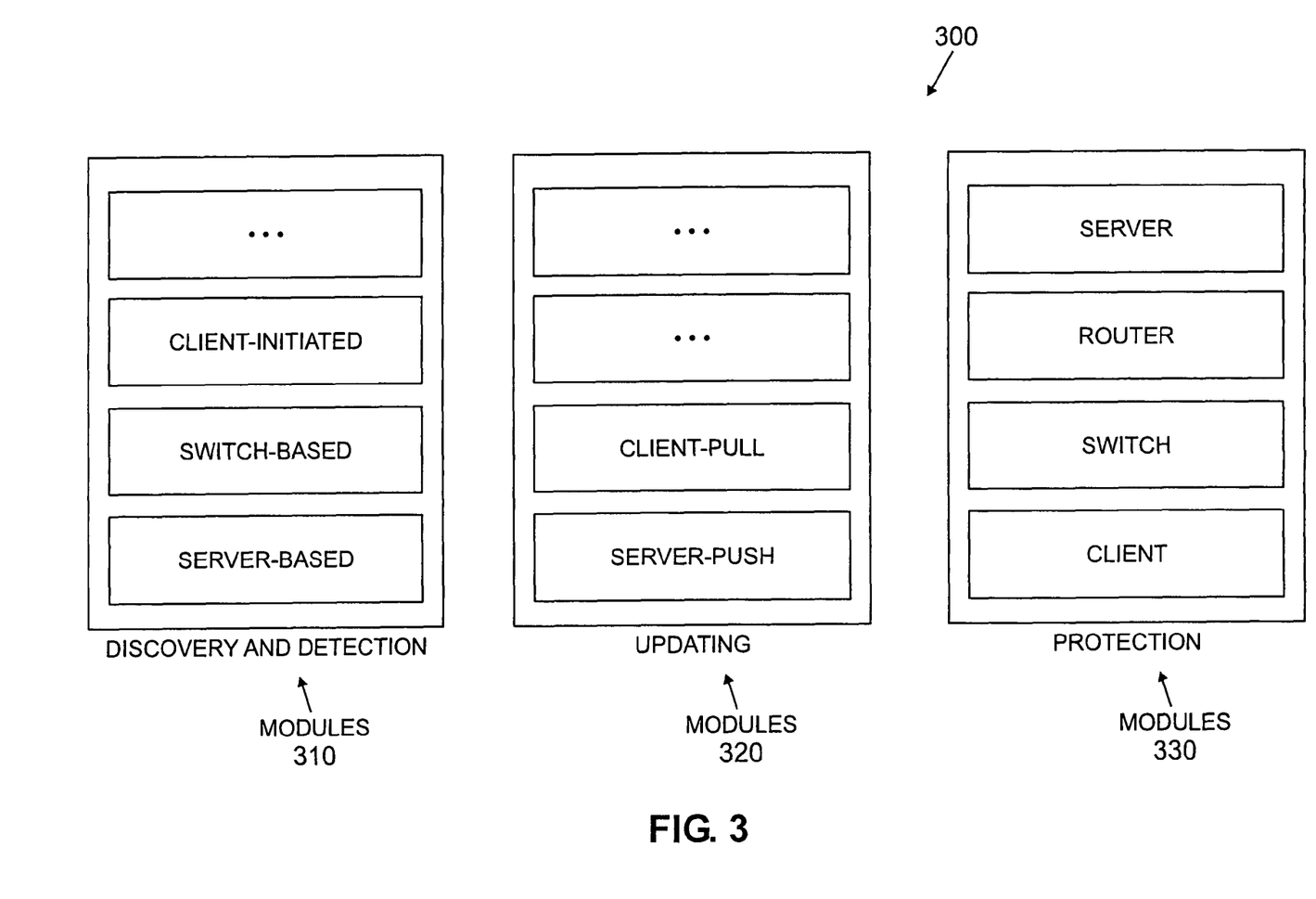
FIG. 3 illustrates a modular implementation of a network security framework incorporating features of the present invention.

As previously indicated, the present invention provides a network security framework 300, shown in FIG. 3, that provides methods and apparatus that protect the network 120 from malware attacks. Generally, the network security framework 300 ensures the compliance-level of connected devices 110 through detection of the state of devices 110, provides for automatic updates of client devices 110, for example, using the update server 125, and limits the access of non-compliant devices based on administrator policy. In the exemplary embodiment described herein, the network security framework 300 is implemented using a modular approach. For example, as shown in FIG. 3, the network security framework 300 can be partitioned into three different categories of modules, namely, (i) discovery and detection modules 310, (ii) updating modules 320, and (iii) protection modules 330.

It should be noted that an actual deployment of the network security framework 300 may consist of a subset of the described modules and need not include one module from each category. Modules may be combined in any reasonable way, as would be apparent to a person of ordinary skill in the art. Depending on the modules that are selected, different functionalities are attained. In addition, a functional module in the network security framework 300 might be distributed across several network elements; for instance, a switch-based discovery and detection module may consist of components residing on several switches (e.g., SNMP traps) as well as a database collecting information.

As shown in FIG. 3, and discussed further below in a section entitled "Discovery and Detection Modules," the network security framework 300 includes a set of discovery and detection modules 310 that collectively allow the devices 110 connecting to the network 120 to be identified, and the current state of each device 110 (e.g., the update level/virus definition version) to be detected. If needed for policy enforcement, the device 110, such as a router 140, that provides access to a given device 110 may also be identified.

When a device 110 connects to the network 120, the authentication server 200 implementing the network security framework 300 must initially discover the device 110. The device discovery functionality is part of the discovery and detection modules 310. The authentication server 200 then determines if the security state of the device 110 is current according to a defined security policy.

The discovery and detection modules 310 may be client-initiated, switch-based (e.g., Simple Network Management Protocol (SNMP) traps from a switch), server-based (e.g., polling by a server), or a combinations of these methods. The functions in the discovery and detection modules 310 thus require server-side processing or client-side processing (or both) and communication between the server and client.

Devices 110 may also be discovered using a distributed discovery scheme, discussed further below in the section entitled "Discovery and Detection Modules." Generally, in the distributed discovery scheme, the devices 110 run agents that are responsible for identifying not only themselves, but also other devices 110 by monitoring traffic (e.g., received broadcast traffic) from other devices 110.

As shown in FIG. 3, the network security framework 300 includes a set of updating modules 320. As previously indicated, the present invention allows a device 110 to obtain an update, for example, from an update server 125, when the device 110 is found to be non-compliant. If a device 110 is not up-to-date, an update could be initiated, for example, via a server-side push from the update server 125 or the device 110 may pull the updates from the update server 125.

In this manner, a device 110 that is not up-to-date can update itself by communicating with the update server 125. The issues related to the processing at both the client side 110 and server side 125; communication between the client 110 and server 125; and update of the client 110, if needed, are discussed below.

As shown in FIG. 3 and discussed further below in the section entitled "Protection Modules," the network security framework 300 includes a set of protection modules 330. As previously indicated, the present invention allows non-compliant devices to be excluded from the network 120 entirely or from using certain network services.

Protection Philosophy Spectrum

Figure 4:
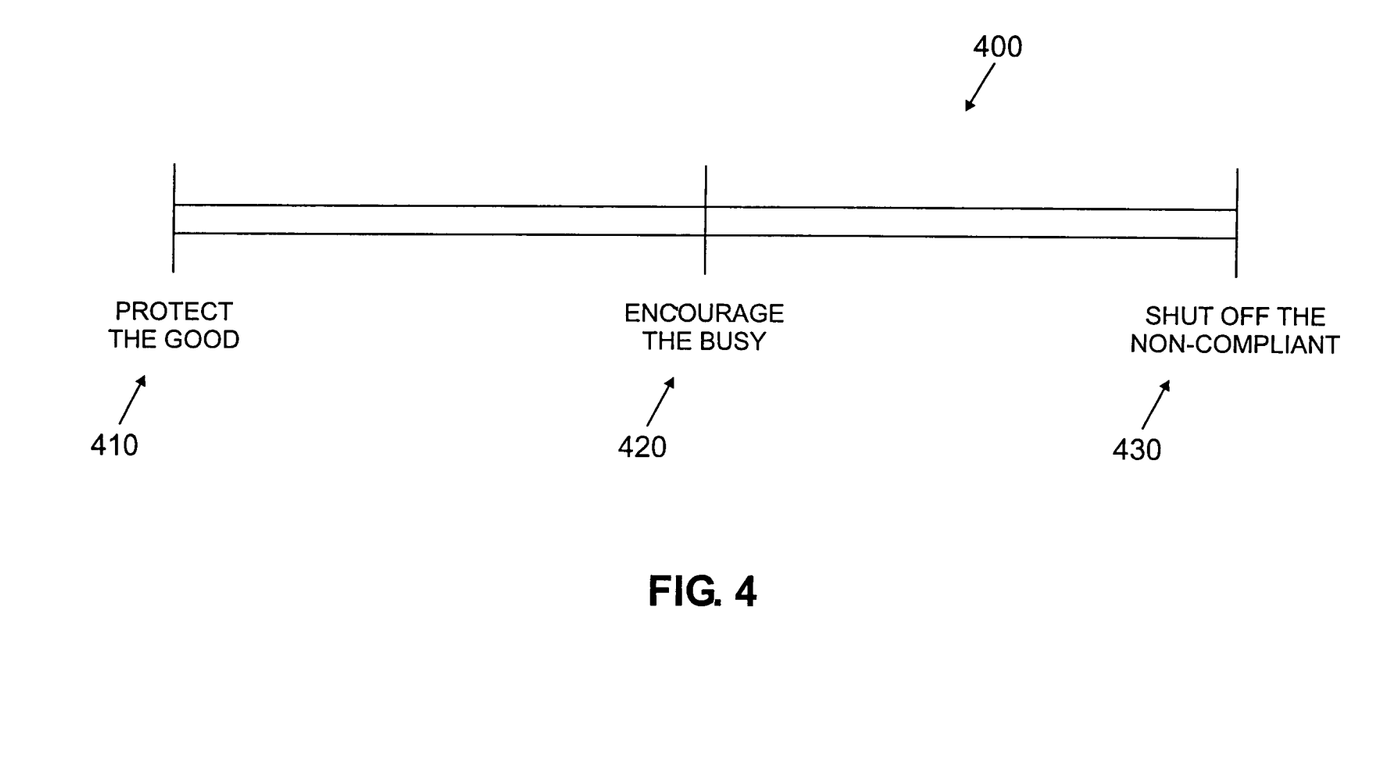
FIG. 4 illustrates a spectrum of protection philosophies that may be selectively implemented by the authentication server of FIG. 2 in accordance with the present invention.

According to another aspect of the invention, shown in FIG. 4, the network security framework 300 supports a spectrum 400 of protection philosophies 410, 420, 430. Each protection philosophy 410, 420, 430 provides a distinct set of features and functions for implementation network security. In particular, the exemplary embodiment of the network security framework 300 supports three protection philosophies, namely, a "protect the good" philosophy 410, an "encourage the busy" philosophy 420 and a "shut off the non-compliant" philosophy 430. Again, a given deployment of the network security framework 300 may not include each of the protection philosophies 410, 420, 430. The protection philosophies 410, 420, 430 may be combined in any reasonable way, as would be apparent to a person of ordinary skill in the art. Depending on the protection philosophies 410, 420, 430 that are selected, different functionalities are attained.

According to the "protect the good" philosophy 410, when a "good" device 110 is not up-to-date, the network security framework 300 protects the "good" device 110 from being infected by malware. As used herein, devices 110 that run required client software and generally keep their computer security protection features up-to-date (for example, according to some predefined measure) can be considered "good" devices 110. There may be instances when a good device is not up-to-date, e.g., when a user goes away on a vacation. The network security framework 300 protects good devices in such situations from being infected by malware.

In one implementation, "good" devices are protected by running a firewall on the device 110 that only allows communication with the authentication server 200 upon boot up. When the configuration of the device 110 is validated (or updated, for example, using the update server 125), the firewall allows general communication for the device 110. In this manner, a device can protect itself from malicious code until the security features of the device are updated, if necessary.

According to the "encourage the busy" philosophy 420, users that are too "busy" to update their network security features are "encouraged" to do so by requiring an up-to-date security state of each device 110 before the user may access one or more network services. It has been observed that busy users may postpone updating their devices and also may choose not to run required client software. Therefore, relying on the self protection mechanism associated with the "protect the good" philosophy 410 is insufficient.

In one implementation, users associated with "busy" devices 110 are encouraged to update such devices 110 by restricting access (for example, at administrator-chosen times) to essential services (referred to as "choke points").

For example, the "encourage the busy" philosophy 420 can restrict access to one or more of VPN gateways, web proxies and servers, corporate databases and financial databases. When the device 110 validates itself to the authentication server 200, the server 200 can open up access to the service. Alternatively, when a device 110 is found to be in violation of a corporate update policy, the device 110 may be denied access to one or more services.

According to the "shut off the non-compliant" philosophy 430, only devices 110 that are found to be compliant with a predefined corporate security policy may be allowed to access the network 120 or network services. In this case, the access device(s), such as the routers 140, that provide network connectivity to the devices 110 are configured to deny access until instructed by the authentication server 200 to allow access to a device 110. The functionality of the "shut off the non-compliant" philosophy 430 can be achieved, for example, using port-based access control mechanisms (e.g., IEEE 802.1x), or IP-based mechanisms. It is noted the rules for allowing or denying access to devices based upon compliance with a security policy could be enforced at different locations in the network 120.

The authentication server 200 can enforce one or more of the "protect the good" philosophy 410, "encourage the busy" philosophy 420 or "shut off the non-compliant" philosophy 430 using the methods described hereinafter.

A system administrator can dynamically change the security requirements implemented by the authentication server 200, for example, that define rules under which devices 110 can connect to the network 120, and can force devices that have already connected to re-authenticate. If such existing devices 110 were allowed according to a previous policy but not for a new policy, the existing devices 110 will be excluded from the network. If a device 110 is denied access to the network 120, a web-page can optionally be pushed to the device 110 that informs the user of the access denial and provides information about how to become compliant and gain access to the network 120. Since access to the update servers 125 is possible at any time, updating such devices 110 can be done by the users without further interaction with system administrators or helpdesk operators.

Discovery and Detection Modules 310

As previously indicated, the network security framework 300 includes a set of discovery and detection modules 310 that collectively allow the devices 110 connecting to the network 120 to be identified, and the current state of each device 110 (e.g., the update level/virus definition version) to be detected.

A. Device Discovery

In each of the exemplary variants of the discovery process discussed herein, agents in the network 120 report information to the authentication server 200 for the network 120. The variants differ in whether the agent resides on the device itself and actively reports to the authentication server 200 or whether the agent is polled for the information, and how the agent learns about the new device 110. In the exemplary embodiment, device discovery is performed at the edge of the network 120. In further variations, discovery can happen at other choke points in the network 120.

(i) Self-Identification

In a self-identification implementation for device discovery, each device 110 runs a client that registers with the authentication server 200 when the device 110 connects to the network 120. In other words, the agent resides on the device 110 itself and thus contacts the authentication server 200 after connecting to the network 120. By monitoring the interfaces on a device 110, a device 110 can detect a new network 120 that it connects to and trigger self-identification with a server 200.

One issue associated with the self-identification implementation for device discovery involves ascertaining the IP address of the authentication server 200 to contact. For scalability, multiple, hierarchically organized authentication servers may be present in a single network 120. There are multiple possibilities regarding how the appropriate authentication server 200 can be found. Apart from first contacting a directory of authentication servers 200 that returns the IP address of the particular server 200 to contact, the address of the server can also be provided using optional fields, for example, in Dynamic Host Configuration Protocol (DHCP) (a protocol for automating the configuration of computers that use TCP/IP) message exchanges. In a further variation, an IP multicast could be used for this problem. Generally, identifying the server 200 to contact may be implemented using any known technique.

If a given device 110 in a self-identification implementation for device discovery fails to identify itself and remains undiscovered, appropriate access policies, such as the "shut off the non-compliant" philosophy 430 described herein will prevent the undiscovered device 110 from using the network 129. Thus, while such undiscovered devices 110 do not pose a threat to network security, it would be beneficial to identify them as well, for example, in order to allow limited network connectivity for the device 110.

One issue associated with the self-identification implementation for device discovery is that the device 110 itself has limited knowledge of the next hop-device 140 that it is connected to. For example, while a device 110 typically knows its IP gateway, the device 110 usually has no knowledge about the Layer 2 switch it is connected to. One or more protection modules discussed below in the section entitled "Protection Modules 330 (Policy Enforcement)," require such information for policy enforcement, and may require more specific details, such as the specific switch port. Thus, the self-identification techniques may be augmented with other device discovery techniques that enable the discovery of devices 110 that do not self-identify and that also allow the retrieval of more detailed information related to connectivity of a device 110.

(ii) Network Device-Based Discovery

In a network device-based implementation for device discovery, networking infrastructure devices, such as network edge routers and switches 149 or servers 125, 200 in the network 120, discover and report newly connected devices 110. The network devices involved in such a discovery scheme may also be the devices used for policy-enforcement.

Reporting of devices may be either active or passive. In an active reporting implementation, a trap (such as an SNMP trap) is sent to the authentication server 200. In a passive reporting implementation, an agent residing on another network device periodically polls the device 110 for information and constructs a list of newly connected clients from this information. Events that generate a trap include a switch port going up/down or the discovery of a new MAC address on a switch port.

As previously indicated, the network security framework 300 may also be used in conjunction with IEEE 802.1x. Therefore, a successful 802.1x-authentication could also trigger a new client trap. It is noted that passive device discovery may be easier to implement for some switches and routers, as this allows the agent for the switch/router to run on a separate network device to synthesize information about new clients from standard information the switch provides by periodically polling (at the expense of a potentially significant delay between device connection and discovery). In order to keep the delay acceptable, the devices must be polled frequently. As an alternative, the agent discovering new clients could be connected to a mirror port of a switch 140 and obtain information about newly connected clients through incoming traffic from these devices 110.

In all of the approaches above, agents can give the authentication server 200 information about the client and its next-hop device. Therefore, this device discovery method does not require any other device discovery techniques also to be used. For a practical deployment, a combination of the two discovery methods may be suitable.

(iii) Distributed Device-Based Discovery Scheme

In a distributed device-based implementation for device discovery, the various devices 110 run agents, in a similar manner to the self-identification scheme. In the distributed device-based implementation for device discovery, however, the device 110 are responsible for identifying other devices by monitoring received broadcast traffic from other devices, as well as self-identification. While some broadcast traffic from unauthenticated devices may be blocked according to access policies, the distributed device-based discovery scheme requires that unauthenticated devices are able to emanate some broadcast frames. Examples of such traffic are DHCP-requests or Address Resolution Protocol (ARP)-requests. For security purposes, ARP replies can be blocked according to policies. When the agent on a device 110 sees such traffic from a new device 110 that it has not seen before, the agent may report the new device 110 to the authentication server 200.

It is possible to push monitoring policies for the discovery agent to the client during authentication or later. Discovery policies can also be updated and changed during operation. Therefore, this distributed scheme scales well since at any point in time only a limited number of devices 110 in the same broadcast domain could be set up to report new clients. Furthermore, this scheme allows for adaptable agent redundancy. Using distributed device-based discovery also has some implications on policy enforcement as will be discussed below in the section entitled "Protection Modules 330 (Policy Enforcement)."

B. Determining Device State

As previously indicated, the discovery and detection modules 310 allow the current security state of each device 110 to be detected. After a device 110 has been discovered, the state of the device 110 needs to be determined and appropriate actions must be taken to enforce appropriate protection policies. This process usually requires interaction between at least the device 10 and an authentication server 200 in the network 120. Both server and client side authentication/validation procedures are possible, as discussed hereinafter.

(i) Server-Side Authentication/Validation Procedures

After the authentication server 200 learns about a new device 10, as described in the previous section, the authentication server 200 determines the access control policy for this device. For this purpose, the device 110 needs to be uniquely identified. In practice, each device 110 can be uniquely identified, for example, using IP and MAC address, CPU IDs or standard cryptographical protocols. For instance, the server 200 may obtain non-forgeable proof of identity from the device 110 by establishing the identity of the device 110 through a public key infrastructure or shared secret-based challenge/response. After establishing the identity of the device 110, the server 200 can retrieve the access and authentication policies for this device from a database.

The server 200 then contacts the device 110 and submits the validation procedure/request. In response, the client submits a response to the server, as discussed in the following section. For instance, the server 200 could request the update (version) level of the operating system and virus scanner version. Based on the response and the policies for this device 110, the server 200 determines the actual access control policies for this device 110. The server 200 then implements these access policies by instructing the appropriate set of devices 110 to enforce or lift restrictions as discussed in the section entitled "Protection Modules 330 (Policy Enforcement)."

Figure 5:
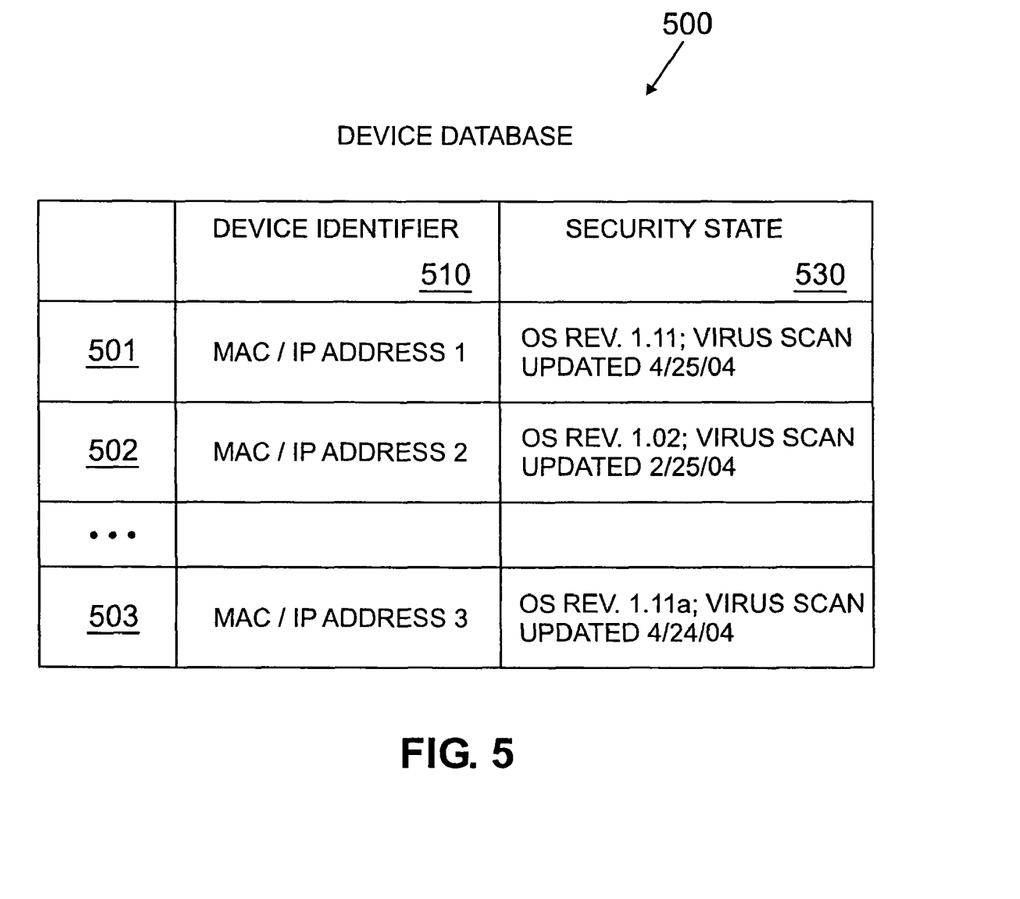
FIG. 5 is a sample table from an exemplary device database of FIG. 2.

FIG. 5 is a sample table from an exemplary device database 500 of FIG. 2. As previously indicated, the device database 500 is maintained by the authentication server 200 to record information for each device. As shown in FIG. 5, the device database 500 includes a plurality of records 501-503, each associated with a different device 110. For each device 110 identified, for example, using a corresponding MAC and IP address in field 510, the device database 500 identifies the current security state in field 530. The current security state recorded in field 530 may include, for example, an identified operating system and version, update level, type of virus scanner, scan engine and virus definition date. In one variation, the device database 500 may also record the IP configuration, including the IP gateway, of each device 110. The current connection state of the device can also be recorded in the database 500 along with a timestamp.

(ii) Client-Side Authentication/Validation

A device 110 that has to undergo authentication procedures runs a client, such as a process listening on a TCP port. The authentication server 200 contacts this port and submits the validation procedure/request to the device 110. On the client side, this request is analyzed and a response is sent to the server 200.

The actual authentication mechanisms are pluggable, meaning that the client can inform the server 200 if the client cannot fulfill an authentication/validation request since the requested procedure is not known to the client. In this case, the server 200 can begin to upload the required code to conduct the procedure to the client that is to be executed. If the authentication fails, the server 200 can also instruct the client side process of the necessary steps required to gain authentication. For instance, authentication may be denied because the device 110 is required to update its operating system or to download a new virus scanner. In this case, the server 200 sets network access policies for the client accordingly, and the client-side process can begin the upgrade. Once the required update is complete, the client can re-authenticate with the authentication server 200.

As previously indicated, the authentication mechanisms of the present invention are pluggable. Thus, the disclosed authentication mechanisms can be extended beyond conventional authentication schemes, as the authentication process is not bounded by any specific protocol exchange sequences and can be conducted in a fully dynamic way. One example of such an extension is a token-based scheme for content authentication. See, U.S. patent application Ser. No. 10/721,721, filed Nov. 25, 2003, entitled "Method and Apparatus for Content Based Authentication for Network Access," incorporated by reference herein.

When the security state of the device changes, the client at the device 110 may inform the server 200 about the new state and the network access policy can be recomputed by the server 200. Alternatively, the server 200 could poll each device 110 periodically to obtain the current state and determine its compliance with the access policy.

Protection Modules 330 (Policy Enforcement)

As previously indicated, the network security framework 300 includes a set of protection modules 330. The protection modules 330 incorporate one or more protection philosophies 410, 420, 430 to implement the network security functions of the present invention. The exemplary embodiment of the network security framework 300 supports three protection philosophies, namely, a "protect the good" philosophy 410, an "encourage the busy" philosophy 420 and a "shut off the non-compliant" philosophy 430.

A. Client-Based Techniques

The "protect the good" philosophy 410 can be implemented using client-based techniques. "Good" devices 110 running client software are protected from malware attacks though a client-side firewall that only allows access to the authentication server 200 in the network 120 when an interface is activated. The authentication server 200 can inform the device 110 about the currently required updates that are necessary to safely operate in the network 120. Moreover, depending on the network 120 the device 110 is currently connected to, the state of this network 120 and more or less restrictive firewall configurations can be advised. The device 110 can monitor its network environment and report events to the server 200. The server 200 can then analyze this information and take appropriate steps to protect this device 110 and other devices 110 currently on the network 120. Such information could also comprise specific input from the user of a device.

Generally, when a new device 110 attempts to connect to the network 120, the server 200 determines whether the new device 110 fulfills corporate standards, such as a minimum security status, and if so, the server 200 determines the appropriate switch/router 140 for pushing "allow rules" for the device 110 and enables access.

Figure 6A:
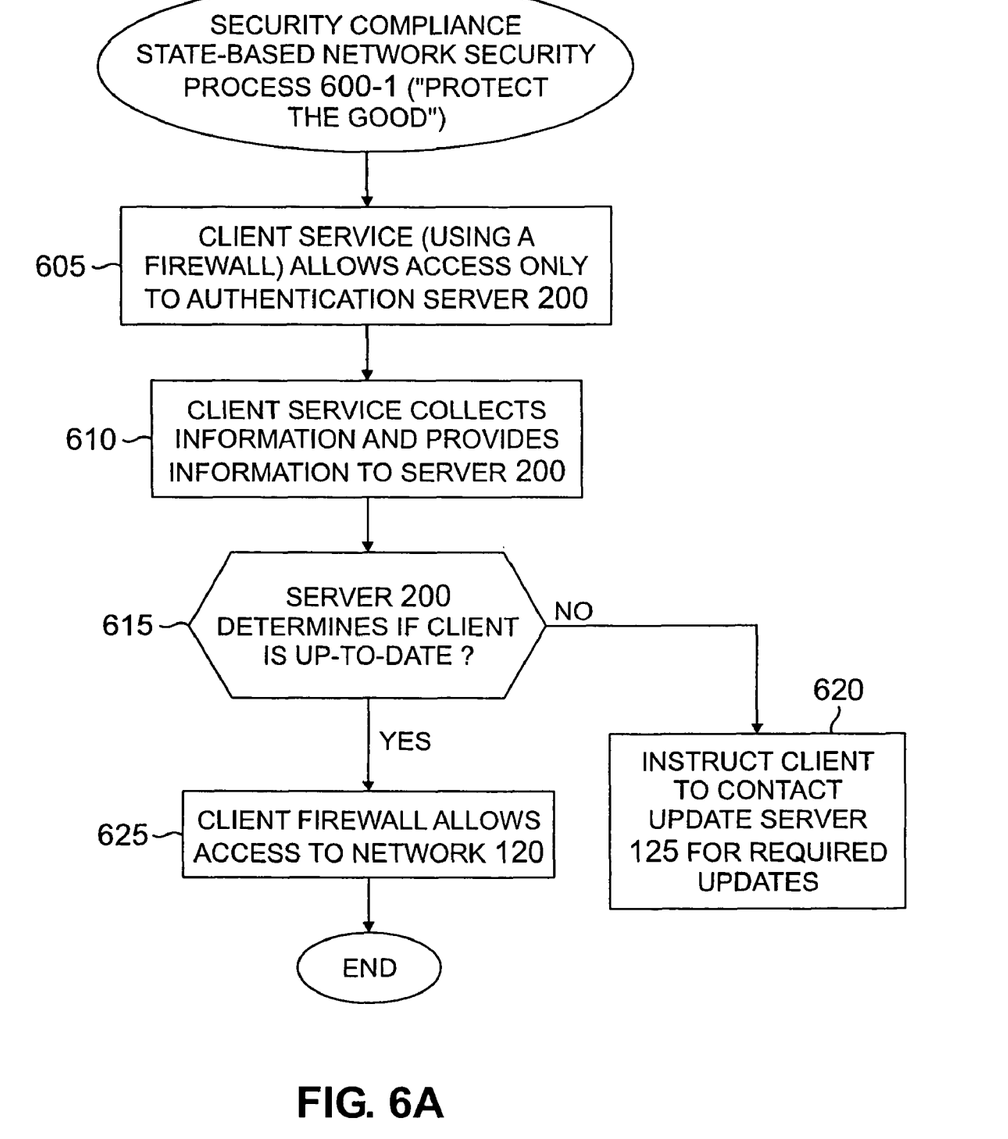
FIGS. 6A, 6B and 6C are each a flow chart describing an exemplary implementation of a security compliance state-based network security process of FIG. 2.

FIG. 6A is a flow chart describing an exemplary implementation of a security compliance state-based network security process 600-1 that implements the "protect the good" philosophy 410 of FIG. 4. As shown in FIG. 6A, when a new device 110 attempts to connect to the network 120, the client service (using a firewall) associated with the new device 110 allows access only to the authentication server 200, during step 605. The client service then collects information and provides the collected information to the server 200 during step 610. For example, the device 110 may communicate its current state, such as operating system and version, update level, type of virus scanner, scan engine and virus definition date. In addition, the device can report its MAC and IP address and the IP configuration, including the IP gateway. This information can be stored by the authentication server 200 in the device database 500.

A test is performed by the server 200 during step 615 to determine if the device 110 is up-to-date (using, for example, the information recorded in the device database 500). The server 200 determines whether the security status of the device 110 satisfies a predefined security standard. If it is determined during step 615 that the device 110 is not up-to-date, then the client is instructed during step 620 to contact the update server 125 for required updates. If it is determined during step 615 that the device 110 is up-to-date, then the client firewall is allowed to access the network 120 during step 625. The appropriate switch/router 140 associated with the device 110 is identified and "allow rules" for the device 110 are forwarded to the switch/router 140.

B. Switch/Router-Based Network Access Control

The "shut off the non-compliant" philosophy 430 can be implemented to exclude non-compliant devices from the network 120 using switch-based access control. If a device 110 is in violation of current security policies, the access of the device 110 to the network 120 can be disrupted by controlling the ports on the device 110 that the device directly connects to or inserting appropriate filtering/firewall rules into the first hop device 140.

While enforcing such access rules as close to the device 110 as possible is desirable, it is also possible to use other devices 110 in the network, e.g., the default IP gateway of the device. Moreover, such filtering rules could be distributed to the devices 110 throughout the network. For example, a number of devices 110 distributed throughout the network 110 can implement authentication functions similar to the authentication server 200, and if a new device 110 is denied access, the authenticating device 110 can notify other peer devices 110 in the same network zone of the failure, so that they can protect themselves from the failed device. In addition, a switch/router 140 that defines the network zone can protect the remainder of the network 120.

Depending on the security policies in place, switch-based network access control allows for a spectrum of enforcement options ranging from "default deny" in which network access for a device 110 must be explicitly granted by a server 200 to "default allow" where access is only blocked for devices 110 that pose a danger to system security, e.g., a device 110 infected with a virus. For example, in an exemplary switch-based access control implementation, a "default-deny" rule in each switch 140 prevents access to the network 120 for devices 110 that were not first authenticated by the authentication server 200. Only connections to the authentication server 200 and update server 125 are permitted for such devices 110.

Figure 6B:
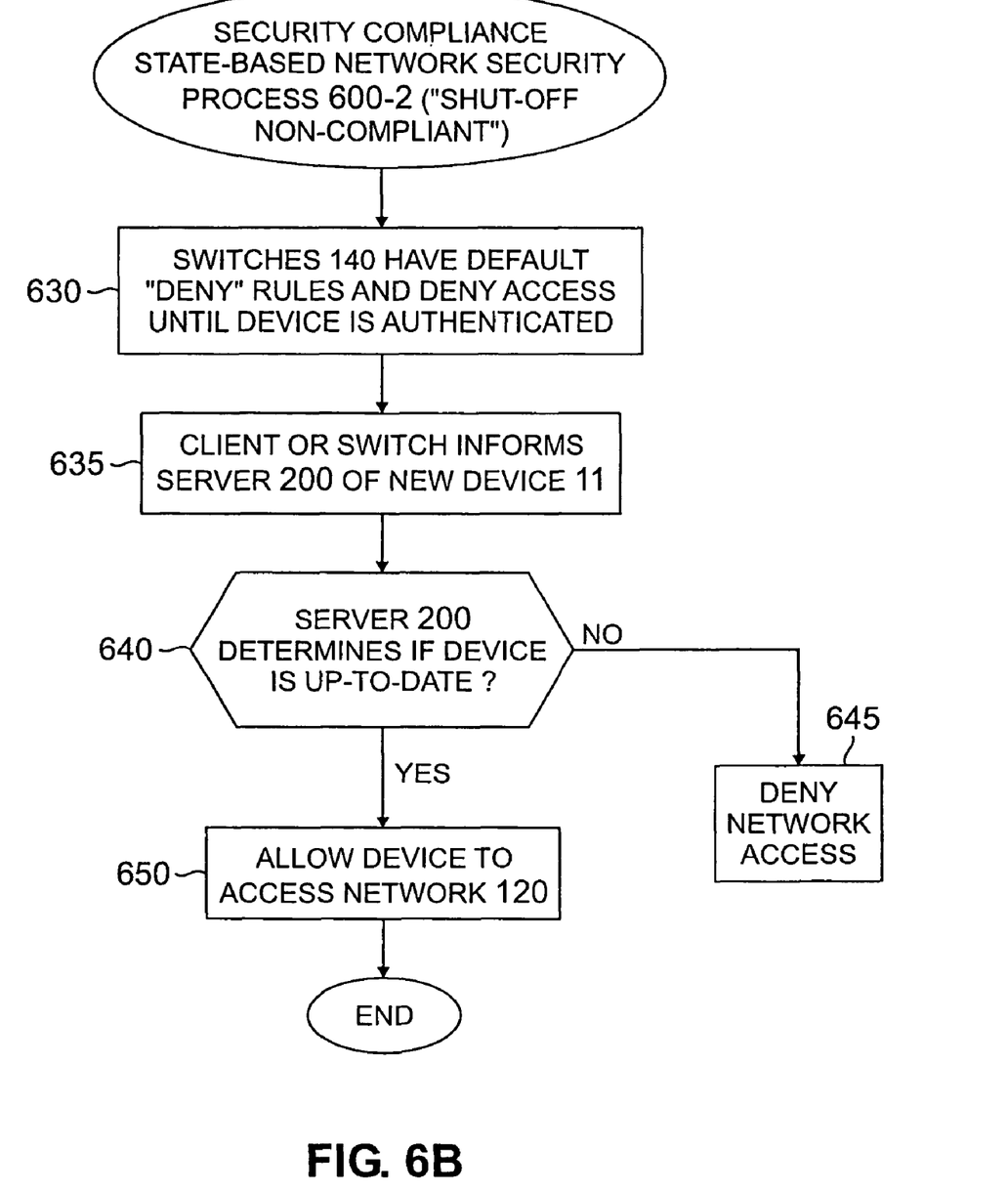

FIG. 6B is a flow chart describing an exemplary implementation of a security compliance state-based network security process 600-2 that implements the "shut off the non-compliant" philosophy 430 of FIG. 4 using an exemplary "default deny" enforcement policy. As shown in FIG. 6B, when a new device 110 attempts to connect to the network 120, the device will be denied access to the network 120, other than the authentication server 200, during step 630 since the switches 140 are implementing a default "deny" set of rules.

The client associated with the device 110, in a self-identification discovery implementation, or the switch 140, in a switch-based discovery implementation, informs the server 200 of the new device 110 during step 635. A test is performed by the server 200 during step 640 to determine if the device 110 is up-to-date (using, for example, the information recorded in the device database 500). If it is determined during step 640 that the device 110 is not up-to-date, then the client is denied access during step 645 (until the device 110 is found to be update-to-date). If it is determined during step 640 that the device 110 is up-to-date, then the switch 140 allows the device to access the network 120 during step 650.

C. Controlling Access to Essential Services

The "encourage the busy" philosophy 420 can be implemented to exclude devices that are in violation of company security policies from using one or more network services, such as WWW proxies, corporate web servers, application servers, and email servers. The "encourage the busy" philosophy 420 can be implemented within the controlled resource (network service) or by putting a network device in front of the controlled resource (network service). The functionality is attained by filtering and/or redirecting traffic from devices that are not in compliance with corporate policies. The devices 110 that are subject to filtering and/or redirection are determined by the authentication server 200 which communicates the identity of these devices to the appropriate controller. For implementing such controllers in hardware, Content-Addressable Memory (CAM)-based architectures can be used.

Figure 6C:
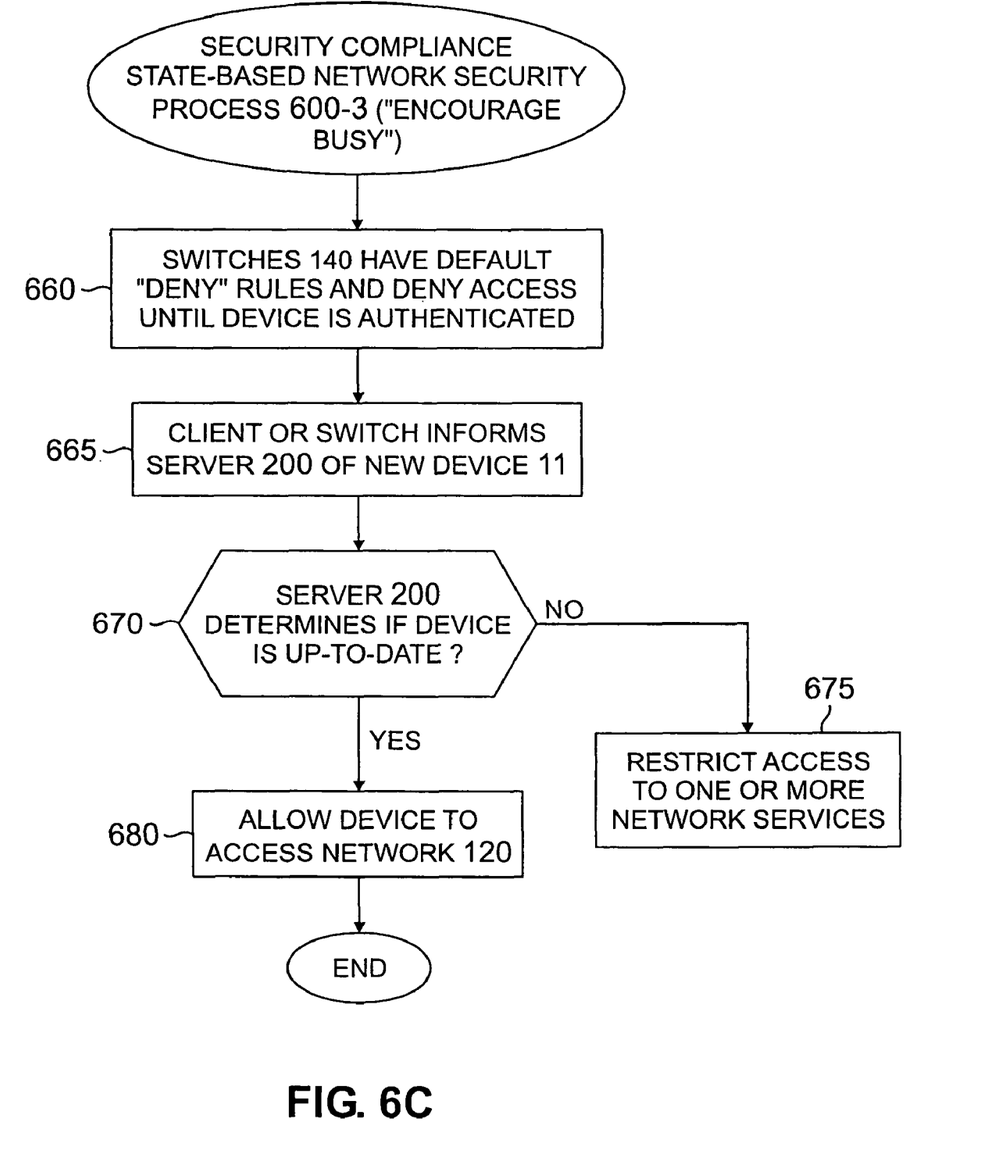

FIG. 6C is a flow chart describing an exemplary implementation of a security compliance state-based network security process 600-3 that implements the "encourage the busy" philosophy 420 of FIG. 4 using an exemplary "default deny" enforcement policy. As shown in FIG. 6C, when a new device 110 attempts to connect to the network 120, the device will initially be denied access to the network 120, other than the authentication server 200, during step 660 since the switches 140 are implementing a default "deny" set of rules.

The client associated with the device 110, in a self-identification discovery implementation, or the switch 140, in a switch-based discovery implementation, informs the server 200 of the new device 110 during step 665. A test is performed by the server 200 during step 670 to determine if the device 110 is up-to-date (using, for example, the information recorded in the device database 500). If it is determined during step 670 that the device 110 is not up-to-date, then the client is restricted from using one or more network services provided by one or more servers 150 (FIG. 1) during step 675 (until the device 110 is found to be up-to-date). If it is determined during step 680 that the device 110 is up-to-date, then the switch 140 allows the device to access the network 120 during step 680.

The present invention recognizes that the access control lists for such network services each provide a "choke point" that can be exploited to provide information to corresponding sets of users in the network. In one variation of the "encourage the busy" philosophy 420, the access control lists for the network services can be used to broadcast messages to the authorized users of any such network service or to the devices that are connected to any network service at a given time.

Article of Manufacture and System Considerations

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method comprising:
    discovering, by a first server, that a telecommunications terminal is attempting to connect to a network, wherein the telecommunications terminal is discovered based on a signal received from a network device that provides network connectivity to the telecommunications terminal;
    receiving, by the first server, from the telecommunications terminal:
        (i) a request to access the network, and
        (ii) an identifier of the telecommunications terminal;
    identifying, by the first server, an indication of a security measure that is implemented by the telecommunications terminal, wherein:
        (i) the indication of the security measure is stored at the first server, and
        (ii) the indication of the security measure is identified based on the identifier of the telecommunications terminal;
    granting the telecommunications terminal access to the network when the first server determines that the indication of the security measure satisfies the security policy; and
    restricting the telecommunications terminal from accessing the network when the first server determines that the indication of the security measure fails to satisfy the security policy;
    wherein the network device restricts the telecommunications terminal from accessing the network in response to the determination that the indication of the security measure fails to satisfy the security policy.

2. The method of claim 1 wherein the first server enables the telecommunications terminal to communicate with, and only with, the first server and a second server when the indication of the security measure fails to satisfy the security policy.

3. The method of claim 2 wherein the second server pushes updates to the telecommunications terminal when the indication of the security measure fails to satisfy the security policy, and wherein the updates automatically update the security measure implemented by the telecommunications terminal.

4. The method of claim 2 wherein the telecommunications terminal pulls updates from the second server when the indication of the security measure fails to satisfy the security policy, and wherein the updates automatically update the security measure implemented by the telecommunications terminal.

5. The method of claim 1 further comprising:
    restricting, by the first server, the telecommunications terminal's access to a Virtual Private Network (VPN) when the indication of the security measure fails to satisfy the security policy.

6. The method of claim 1 wherein the network device is different from:
    (i) the first server, and
    (ii) a second server that provides updates to the telecommunications terminal.

7. The method of claim 1 wherein, when the telecommunications terminal is powered-on, a client-side firewall only enables the telecommunications terminal to communicate with, and only with, the first server.

8. The method of claim 1 further comprising:
    pushing, by the first server, a message to the telecommunications terminal when the indication of the security measure fails to satisfy the security policy, wherein the message provides information on how to satisfy the security policy.

9. The method of claim 1 wherein a client-side application monitors a network interface of the telecommunications terminal, and wherein the client-side application automatically transmits the request to the first server when the telecommunications terminal connects to the network.

10. The method of claim 1 wherein the telecommunications terminal identifies the first server, among a plurality of servers, to request access to the network based on a Dynamic Host Configuration Protocol (DHCP).

11. The method of claim 1 wherein granting or restricting the telecommunications terminal's access to the network is also based on a specific port of the network device that provides network connectivity to the telecommunications terminal, and wherein the network device is different from:
    (i) the first server, and
    (ii) a second server that provides updates to the telecommunications terminal.

12. The method of claim 1 further comprising:
    receiving, by the first server, another request to access the network from the telecommunications terminal, wherein the telecommunications terminal is granted access to the network based on the fact that the security measure has been updated by the telecommunications terminal after being restricted from the network.

13. The method of claim 1 wherein the identifier is at least one of an Internet Protocol (IP) address and a Media Access Control (MAC) address of the telecommunications terminal.

14. The method of claim 1 wherein the indication of the security measure is an operating system that is implemented by the telecommunications terminal, and wherein:
    (i) the indication of the security measure satisfies the security policy when a version of the operating system is up-to-date according to the security policy, and
    (ii) the indication of the security measure fails to satisfy the security policy when the version of the operating system is not up-to-date according to the security policy.

15. The method of claim 1 wherein the indication of the security measure is virus scanner that is implemented by the telecommunications terminal, and wherein:
    (i) the indication of the security measure satisfies the security policy when a version of the virus scanner is up-to-date according to the security policy, and
    (ii) the indication of the security measure fails to satisfy the security policy when the version of the virus scanner is not up-to-date according to the security policy.

16. The method of claim 1 further comprising:
    broadcasting, by the network device, a message to other network devices in the network when the telecommunications terminal is restricted from accessing the network, wherein the broadcasted message notifies the other network devices in the network that the security measure implemented by the telecommunications terminal fails to satisfy the security policy.

17. A method comprising:
    discovering, by a first server, that a telecommunications terminal is attempting to connect to a network, wherein the telecommunications terminal is discovered based on a first signal received from a network device that provides network connectivity to the telecommunications terminal;
receiving, by the first server, from the telecommunications terminal:
(i) a request to access the network, and
(ii) an identifier of the telecommunications terminal;
identifying, by the first server, a first security policy of the telecommunications terminal based on the identifier;
transmitting, by the first server, a request for an indication of a security measure implemented by the telecommunications terminal;
receiving, by the first server, a response that includes the indication of the security measure implemented by the telecommunications terminal;
identifying, by the first server, a second security policy based on:
(i) the first security policy, and
(ii) the response that includes the indication of the security measure implemented by the telecommunications terminal; and
transmitting, by the first server, a second signal to the network device based on the second security policy, wherein the second signal instructs the network device to restrict the telecommunications terminal from accessing the network.

18. The method of claim 17 wherein the first server enables the telecommunications terminal to communicate with, and only with, the first server and a second server when the telecommunications terminal is restricted from accessing the network.

19. The method of claim 18 wherein the second server pushes updates to the telecommunications terminal when the telecommunications terminal is restricted from accessing the network, and wherein the updates automatically update the security measure implemented by the telecommunications terminal.

20. The method of claim 18 wherein the telecommunications terminal pulls updates from the second server when the telecommunications terminal is restricted from accessing the network, and wherein the updates automatically update the security measure implemented by the telecommunications terminal.

21. The method of claim 17 wherein the task of restricting the telecommunications terminal's access to the network further comprises restricting the telecommunications terminal's access to a Virtual Private Network (VPN).

22. The method of claim 17 wherein the network device is different from:
(i) the first server, and
(ii) a second server that provides updates to the telecommunications terminal.

23. The method of claim 17 wherein, when the telecommunications terminal is powered-on, a client-side firewall only enables the telecommunications terminal to communicate with, and only with, the first server.

24. The method of claim 17 wherein a client-side application monitors a network interface of the telecommunications terminal, and wherein the client-side application automatically transmits the request to the first server when the telecommunications terminal connects to the network.

25. The method of claim 17 wherein the telecommunications terminal identifies the first server, among a plurality of servers, to request access to the network based on a Dynamic Host Configuration Protocol (DHCP).

26. The method of claim 17 wherein granting or restricting the telecommunications terminal's access to the network is also based on a specific port of the network device that provides network connectivity to the telecommunications terminal, and wherein the network device is different from:
(i) the first server, and
(ii) a second server that provides updates to the telecommunications terminal.

27. The method of claim 17 further comprising:
receiving, by the first server, another request to access the network from the telecommunications terminal, wherein the telecommunications terminal is granted access to the network based on the fact that the security measure has been updated by the telecommunications terminal after being restricted from the network.

28. The method of claim 17 wherein the identifier is at least one of an Internet Protocol (IP) address and a Media Access Control (MAC) address of the telecommunications terminal.

29. The method of claim 17 further comprising:
broadcasting, by the network device, a message to other network devices in the network when the telecommunications terminal is restricted from accessing the network, wherein the broadcasted message notifies the other network devices in the network that the telecommunications terminal is restricted from accessing the network.

* * * * *